(12) United States Patent
Rausch

(10) Patent No.: US 7,550,944 B1
(45) Date of Patent: Jun. 23, 2009

(54) SOLAR-POWERED BATTERY CHARGER CIRCUIT

(75) Inventor: Walter Fred Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 445 days.

(21) Appl. No.: 11/252,023

(22) Filed: Oct. 17, 2005

(51) Int. Cl.
*H02J 7/00* (2006.01)

(52) U.S. Cl. ...................................... 320/108; 320/101

(58) Field of Classification Search ................. 320/101, 320/108
See application file for complete search history.

(56) References Cited

U.S. PATENT DOCUMENTS

| | | | | |
|---|---|---|---|---|
| 3,840,796 A | * | 10/1974 | Tozaki | 320/140 |
| 4,274,044 A | | 6/1981 | Barre | |
| 4,626,764 A | * | 12/1986 | Weinhardt | 320/102 |
| 5,276,393 A | | 1/1994 | Gali | |
| 5,631,534 A | * | 5/1997 | Lewis | 320/103 |
| 5,717,562 A | | 2/1998 | Antone et al. | |
| 5,736,833 A | * | 4/1998 | Farris | 320/163 |
| 5,907,238 A | * | 5/1999 | Owerko et al. | 323/349 |
| 2005/0134212 A1 | | 6/2005 | Chuang | |

FOREIGN PATENT DOCUMENTS

GB 2318466 4/1998

* cited by examiner

*Primary Examiner*—Akm E Ullah
*Assistant Examiner*—Samuel Berhanu

(57) ABSTRACT

An interface circuit charges a rechargeable battery from a power source. A normally-closed relay with normally-closed switch contacts and a coil having a first end and a second end has its normally-closed switch contacts and the coil coupled in series between first and second input terminals. An EMF conduction diode is coupled between a fourth output terminal and a junction between the normally-closed switch contacts and the first end of the coil. The second end of the coil is coupled to a third output terminal. Current supplied from the power source energizes the coil and causes the normally-closed switch contacts to oscillate between an open condition and a closed condition. Energy transferred from the power source to an electromagnetic field of the coil when the normally-closed switch contacts are in the closed condition is transferred by discharging the electromagnetic field in response to current through the EMF conduction diode when the normally-closed switch contacts are in the open condition.

15 Claims, 2 Drawing Sheets

SOLAR-POWERED BATTERY CHARGER CIRCUIT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to battery chargers, and, more specifically, to an interface circuit for coupling energy from a solar panel to a battery to be recharged.

Rechargeable batteries are used as a power source in a wide variety of devices and machines and over a great range of voltages and storage capacities. The chemistries of conventional rechargeable batteries include lead-acid, nickel-cadmium, nickel metal-hydride, and lithium ion, among others. Each chemistry has a corresponding unique cell mid-point voltage. Particular batteries may use various combinations of cells, resulting in an ability to provide rechargeable batteries with many different terminal voltages.

Different rechargeable batteries have different requirements for an associated battery charger that can be used to deliver a charging current or voltage that most safely and effectively charges the battery. A recharge voltage must be provided that is greater than the terminal voltage of the rechargeable battery in order to reverse current through the battery during a charge cycle. On the other hand, battery damage may result if too high of a charging current is forced through the battery for too long of a time period. Chargers can also be used with battery chemistries not usually considered to be rechargeable, such as restoring charge to slightly used alkaline batteries. Thus, battery chargers are needed covering a wide variety of characteristics.

A charger can be made inexpensively to satisfy the charging requirements of one specific battery type, but no charger has met the specifications for charging very many different battery types without utilizing complicated and expensive circuits for performing voltage or current conversions and for monitoring battery charge cycles. Charger design also depends upon the power source being used. For example, a charger may be designed to utilize AC power from a fixed outlet of a power grid or DC power from a voltage generator such as a solar panel. Thus, typical chargers in the prior art are either designed for one specific input voltage or use complex circuits for adapting to different input voltages.

SUMMARY OF THE INVENTION

The present invention has the advantage of providing a single interface circuit that is automatically adaptable to a range of input voltages and a range of rechargeable battery voltages using a simple, inexpensive circuit.

In one aspect of the invention, an interface circuit is provided for charging a rechargeable battery from a power source. First and second input terminals are adapted to be coupled to the power source. Third and fourth output terminals are adapted to be coupled to the rechargeable battery. A normally-closed relay with normally-closed switch contacts and a coil having a first end and a second end has its normally-closed switch contacts and the coil coupled in series between the first and second input terminals. An EMF conduction diode is coupled between the fourth output terminal and a junction between the normally-closed switch contacts and the first end of the coil. The second end of the coil is coupled to the third output terminal. Current supplied from the power source energizes the coil and causes the normally-closed switch contacts to oscillate between an open condition and a closed condition. Energy transferred from the power source to an electromagnetic field of the coil when the normally-closed switch contacts are in the closed condition is transferred by discharging the electromagnetic field in response to current through the EMF conduction diode when the normally-closed switch contacts are in the open-condition.

DETAILED DESCRIPTION OF PREFERRED EMBODIMENTS

Figure 1:
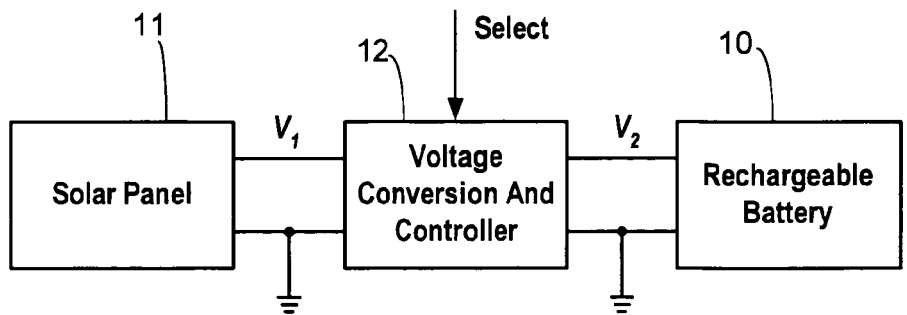
FIG. 1 is a block diagram showing a prior art solar-powered battery charging system.

FIG. 1 shows a known system for recharging a battery 10 using a solar panel 11. One typical type of rechargeable battery is a lead-acid battery used in a transportation vehicle such as a car, truck, or boat for starting a combustion engine or for powering electrical loads when the combustion engine is not operating, wherein the battery is recharged by a generator or alternator when the combustion engine is operating. If the vehicle is not used for a long period (as when a boat is in storage or a car is parked at an airport during an extended trip), the battery may discharge so that it is not able to start the engine. Trickle-charging systems have been connected to such a battery to maintain charge during these extended periods. In order to allow operation away from an available connection to an AC power grid, photovoltaic panels are often used.

A solar panel can be constructed with the corresponding number of cells in order to provide a desired voltage. A specific solar panel design can be matched to a particular battery type and voltage, resulting in a recharger product that is specifically tied to one particular use. Alternatively, a voltage conversion and controller circuit 12 can be provided between solar panel 11 (having an arbitrary voltage) and battery 10 in order to adapt the charging process to different battery types. A manual select signal may be provided to reconfigure controller 12 so that a voltage $V_1$ from panel 11 is properly converted to a voltage $V_2$ needed for recharging battery 10.

Figure 2:
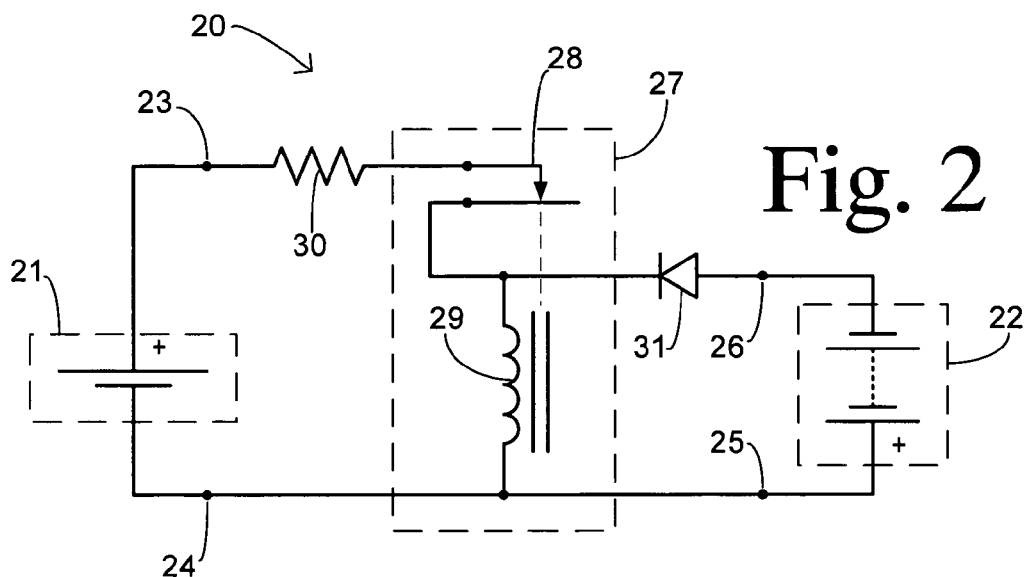
FIG. 2 is a schematic diagram of a preferred embodiment of an interface circuit.

Instead of requiring dedicated circuits or complex adjustable circuits, it would be desirable to provide an interface circuit with relatively few components and that does not require specific adjustments or configuration. FIG. 2 shows an interface circuit that is self-adapting to provide an appropriate battery recharging current regardless of the voltage supplied by the power source or the terminal voltage of the rechargeable battery.

An interface circuit 20 is connected between a power source 21 and a rechargeable battery 22. Power source 21 may comprise a photovoltaic solar panel or any other source of constant or variable DC voltage. Battery 22 may be an individual battery unit or a plurality of units connected together in series and/or parallel. Interface circuit 20 provides first and second input terminals 23 and 24 and third and fourth output terminals 25 and 26. A normally-closed relay 27 has normally-closed switch contacts 28 connected in series with a coil 29 between input terminals 23 and 24. A step-down resistor 30 may also be provided in series with relay 27 so that a solar panel 21 can be used that outputs a voltage higher than the voltage rating of relay 27. A unidirectional conducting device such as a diode 31 is connected between output terminal 26 and the junction between switch contacts 28 and coil 29.

In operation, solar panel 21 initially provides voltage and current to coil 29 through normally-closed switch contacts 28. Coil 29 becomes energized and an electromagnetic field (EMF) is created around the coil which stores energy from solar panel 21. Once the field is strong enough, it opens switch contacts 28 thereby disconnecting solar panel 21 from coil 29 and interrupting its excitation. As coil 29 discharges, the collapsing EMF generates a voltage across coil 29 having an opposite polarity. This flyback voltage will rise to any magnitude that is necessary to release the energy trapped in the field. Therefore, the voltage rises to a sufficiently high level to force a current across output terminals 25 and 26 (e.g., through battery 22) and to forward bias EMF conduction diode 31. After the EMF collapses, switch contacts 28 once again become closed and solar panel 21 can recreate the field. Relay 27 oscillates in this manner as long as power is supplied by solar panel 21. An advantageous charging current magnitude is provided for battery 22 since a charging voltage is automatically created having a magnitude which rises from zero until it is just sufficient to force the charging current to flow.

Figure 3:
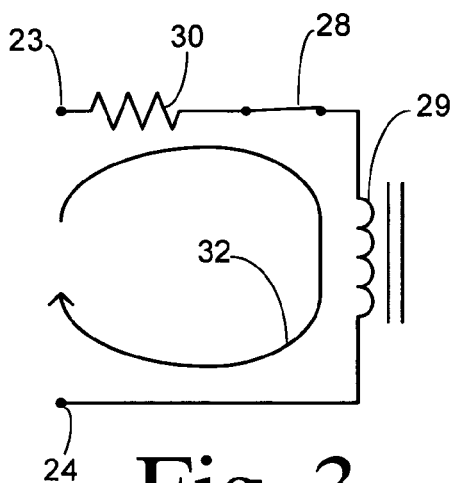
FIG. 3 illustrates current flow in the interface circuit with the relay contacts of FIG. 2 in a closed condition for creating an electromagnetic field associated with the relay coil.
Figure 4:
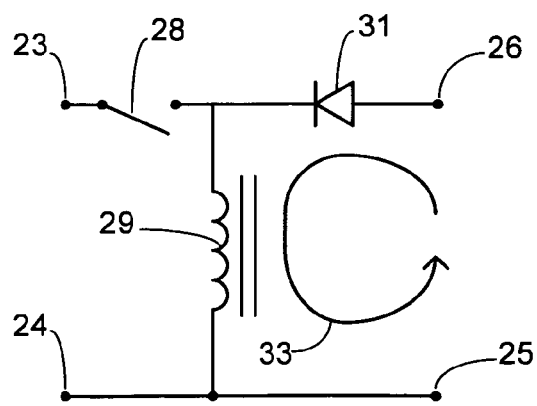
FIG. 4 illustrate current flow in the interface circuit with the relay contacts of FIG. 2 in an open condition for discharging the electromagnetic field associated with the relay coil.

FIG. 3 shows current flow during a first phase of operation when switch contacts 28 are in a closed condition. Current flows between input terminals 23 and 24 in the direction shown by current loop 32. FIG. 4 shows current flow during a second phase of operation when an electromagnetic field from coil 29 moves switch contacts 28 into an open condition, so that current flows between output terminals 25 and 26 in the direction shown by current loop 33.

Figure 5:
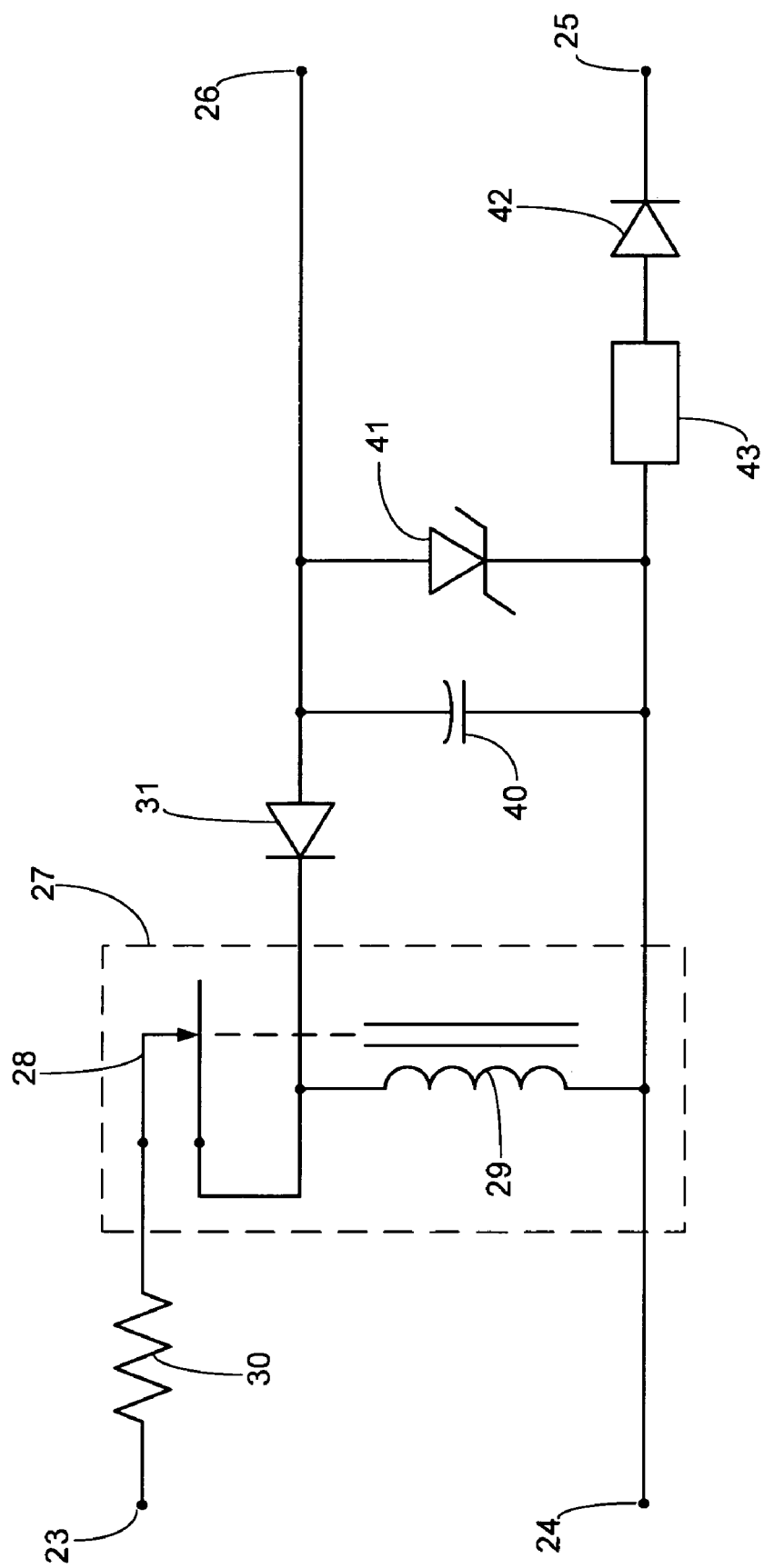
FIG. 5 is a schematic diagram of another preferred embodiment of an interface circuit.

The invention shown in FIG. 2 is suitable for a permanent connection to battery 22 so that a load is always present across coil 29 when a collapsing EMF is generating a flyback voltage. Without a suitable load, the flyback voltage could rise to extremely high levels until the energy discharged by arcing across switch contacts 28 or other catastrophic failure. FIG. 5 shows an alternative embodiment wherein a charge storage device such as a capacitor 40 is coupled across output terminals 25 and 26 to provide a sink for flyback current when no battery is present. A voltage limiting device such as a zener diode 41 may also be provided across output terminals 25 and 26 to protect capacitor 40 from voltages accumulating above its rated capacity.

A high battery voltage protection diode 42 is connected in series with output terminal 25. If the battery is also connected to another charging means, such as an alternator that charges the battery during operation of the internal combustion engine, then voltages (e.g., pulses or other transients) that are much higher than the nominal battery voltage could appear across output terminals 25 and 26. The higher voltages could cause zener diode 41 to conduct current higher than its rating. Diode 42 prevents damage by preventing current from flowing from terminals 25 and 26 into the interface circuit.

An optional fast-acting fuse 43 may also be connected in series with protection diode 42. In the event that the battery were to fail in a reverse voltage state, excessive current could be forced into the interface circuit which could damage the components. Fuse 43 may be rated at about ½ amp, for example, in order to prevent this damage.

In one specific embodiment of the present invention, a solar panel was used that provided an output voltage of 11 volts DC. Relay 27 was rated for 5 volts DC and had a coil resistance of about 56 ohms. Resistor 30 was provided with a step-down resistance of about 62 ohms to limit the voltage across relay 27 to 5 volts. Diodes 31 and 42 comprised 1N4003 diodes rated for 200 VDC and 1 amp. Capacitor 40 had a capacitance of 500 microFarads and was rated for 35 VDC. Zener diode 41 provided a breakdown voltage at 24 volts DC. As a result, the interface circuit was adapted to charging any rechargeable battery pack requiring a charge voltage in the range of about 6 volts DC to about 22 volts DC.

What is claimed is:

1. An interface circuit for charging a rechargeable battery from a power source, comprising:
    first and second input terminals adapted to be coupled to said power source;
    third and fourth output terminals adapted to be coupled to said rechargeable battery;
    a normally-closed relay having normally-closed switch contacts and a coil having a first end and a second end, wherein said normally-closed switch contacts and said coil are connected in series between said first and second input terminals; and
    an EMF conduction diode coupled between said fourth output terminal and a junction between said normally-closed switch contacts and said first end of said coil;
    wherein said second end of said coil is coupled to said third output terminal, wherein current supplied from said power source through said normally-closed switch contacts energizes said coil to generate an electromagnetic field that causes said normally-closed switch contacts to open and thus remove said supplied current from said coil so that said normally-closed switch contacts continue to oscillate between an open condition and a closed condition, and wherein energy transferred from said power source to said electromagnetic field of said coil when said normally-closed switch contacts are in said closed condition is transferred by discharging said electromagnetic field in response to current through said EMF conduction diode when said normally-closed switch contacts are in said open condition.

2. The interface circuit of claim 1 further comprising:
    a charge storage device coupled between said third and fourth output terminals.

3. The interface circuit of claim 2 wherein said charge storage device is comprised of a capacitor.

4. The interface circuit of claim 1 further comprising:
    a voltage limiting device coupled between said third and fourth output terminals.

5. The interface circuit of claim 4 wherein said voltage limiting device is comprised of a zener diode.

6. The interface circuit of claim 1 further comprising:
    a high battery voltage protection diode coupled to said third output terminal.

7. The interface circuit of claim 6 further comprising:
    a fuse in series with said high battery voltage protection diode.

8. The interface circuit of claim 1 further comprising:
a step-down resistor coupled between said first input terminal and said normally-closed relay.

9. A method of recharging a rechargeable battery from a power source, said method comprising the steps of:
connected said power source across a series combination of the normally-closed contacts of a normally-closed relay with a coil of said normally-closed relay so that said normally-closed contacts oscillate between a closed condition and an open condition, wherein said coil stores energy from said power source in an electromagnetic field when said normally-closed contacts are in said closed condition; and
when said normally-closed contacts switch to said open condition, transferring said energy from said coil as said electromagnetic field discharges to said rechargeable battery via a unidirectional conducting device.

10. The method of claim 9 further comprising the step of:
storing said energy transferred from said coil as said electromagnetic field discharges in a charge storage device coupled across said rechargeable battery.

11. The method of claim 9 further comprising the step of:
clamping a voltage across said coil during discharge of said electromagnetic field to a predetermined voltage.

12. The method of claim 9 further comprising the step of:
stepping down a voltage from said power source provided to said normally-closed relay by providing a step-down resistor therebetween.

13. The method of claim 9 wherein said unidirectional conducting device comprises a diode.

14. The method of claim 9 wherein said power source is comprised of a solar panel.

15. The method of claim 9 wherein said rechargeable battery is comprised of a battery bank.

* * * * *